May 26, 1959　　　J. C. NEWTON　　　2,887,927
OPTICAL CONTROL INSTRUMENT

Filed Jan. 21, 1953　　　　　　　　6 Sheets-Sheet 1

INVENTOR
JOHN C. NEWTON
BY
John C. McGregor
ATTORNEY

INVENTOR
JOHN C. NEWTON
BY
John C. McGregor
ATTORNEY

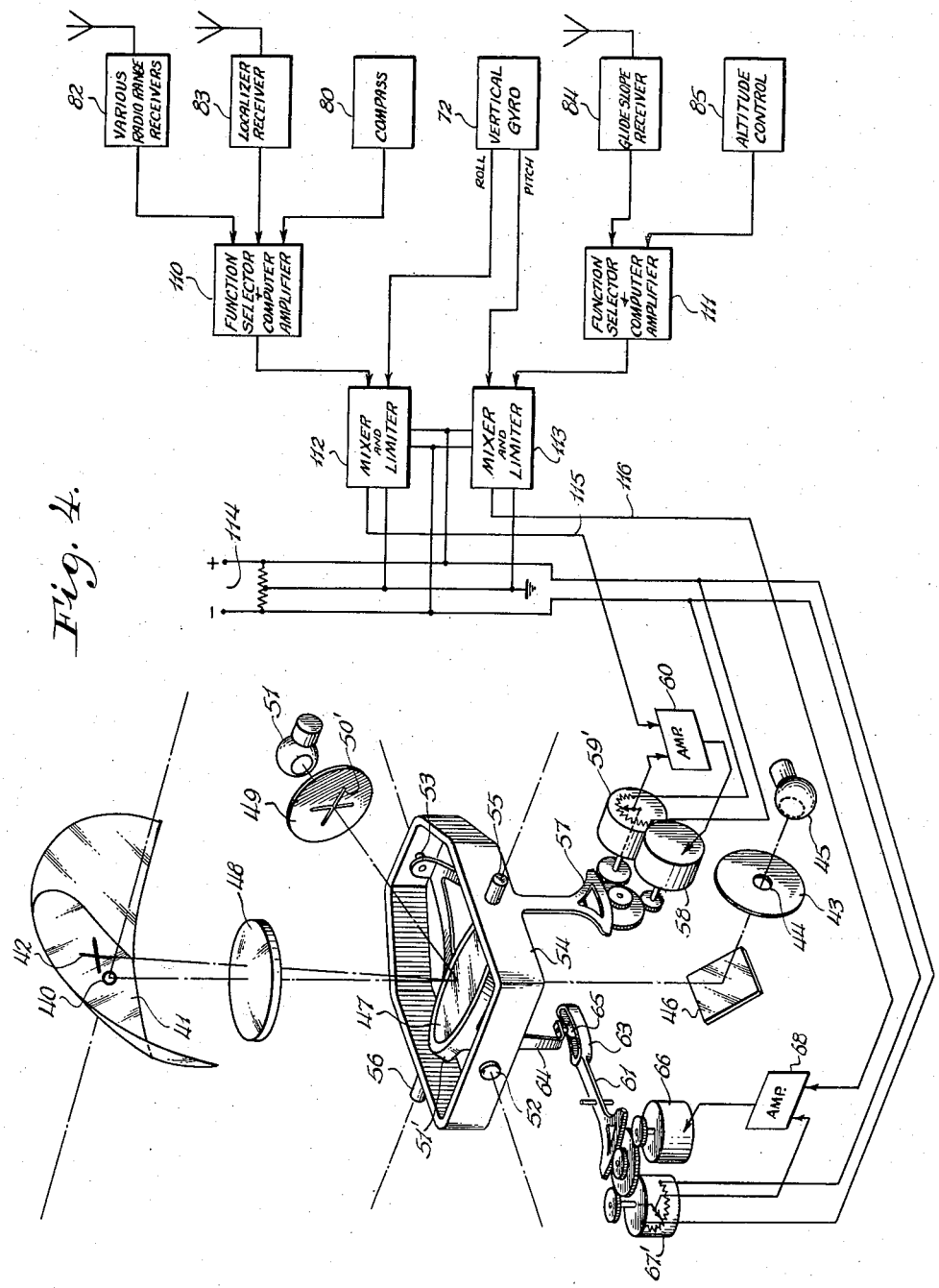

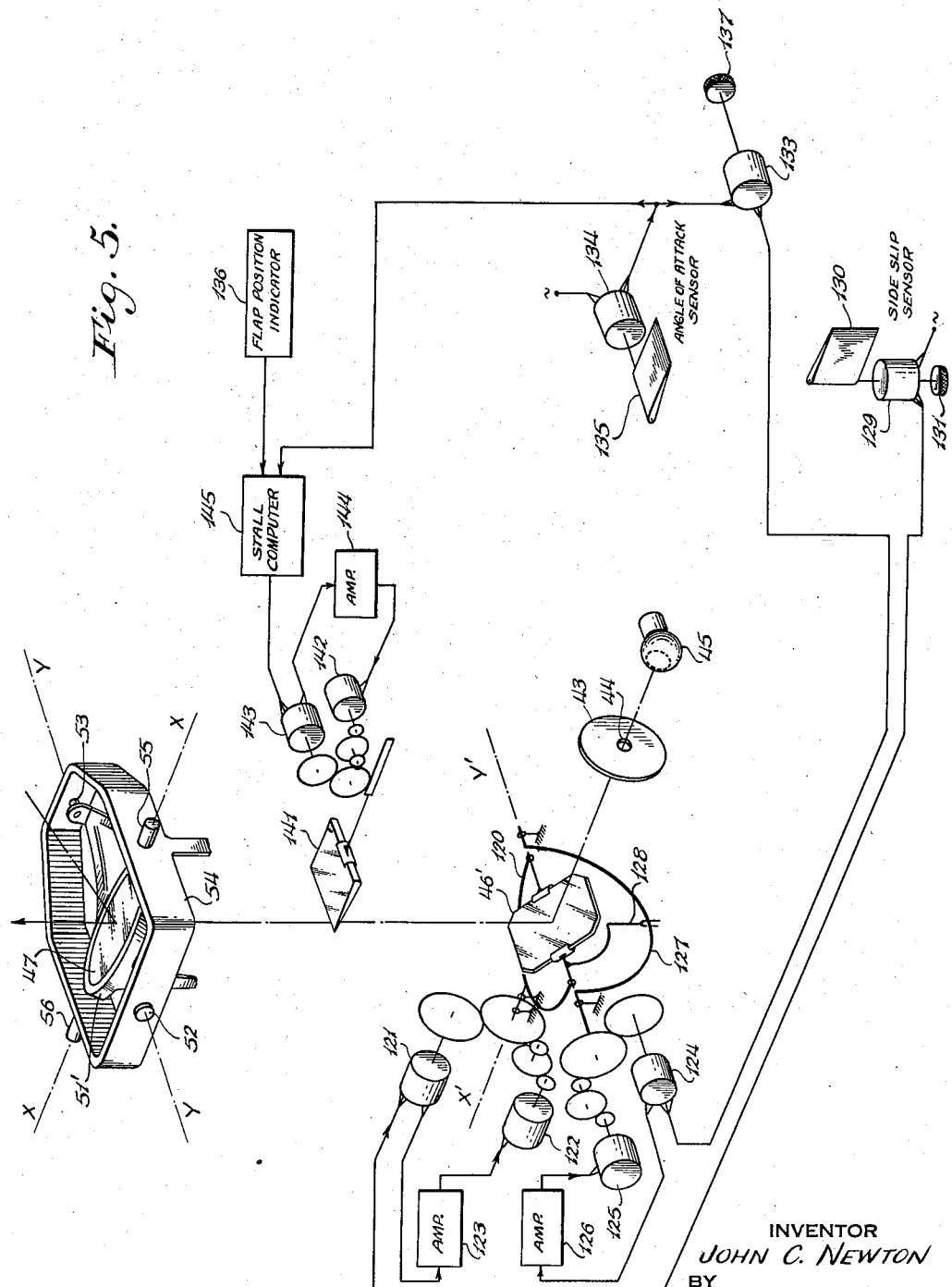

May 26, 1959  J. C. NEWTON  2,887,927
OPTICAL CONTROL INSTRUMENT
Filed Jan. 21, 1953  6 Sheets-Sheet 6
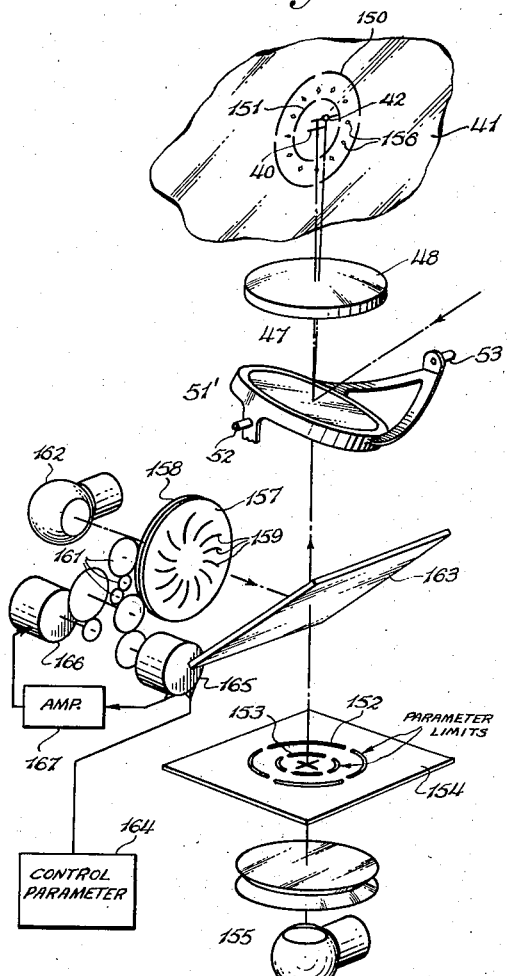
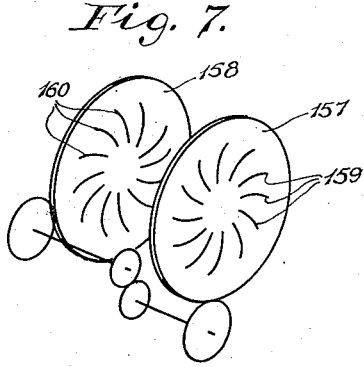
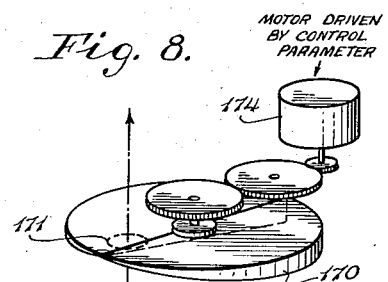
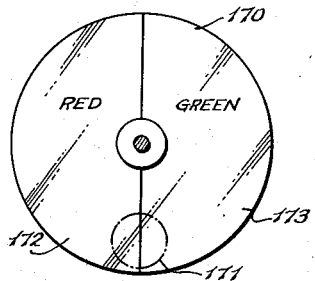
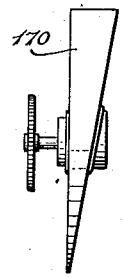
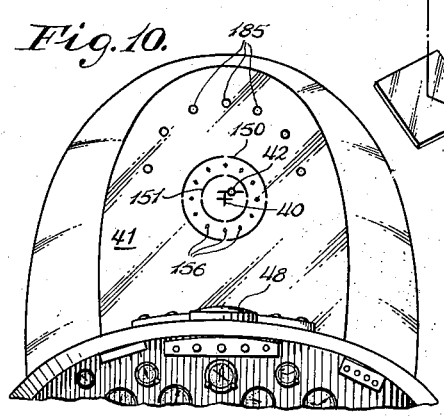
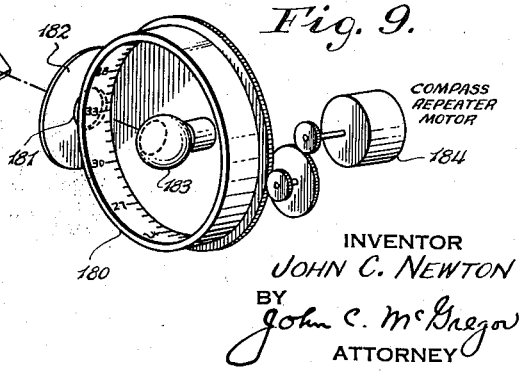
INVENTOR
JOHN C. NEWTON
BY
John C. McGregor
ATTORNEY

United States Patent Office 2,887,927
Patented May 26, 1959

2,887,927

OPTICAL CONTROL INSTRUMENT

John C. Newton, Roslyn Heights, N.Y., assignor to Specialties, Inc., Syosset, N. Y., a corporation of New York Application January 21, 1953, Serial No. 332,277

2 Claims. (Cl. 88—1)

This invention relates to control instruments and more particularly to such instruments in which the indications of the control parameters are focused at infinity within the operators normal field of vision.

In many control operations it is desirable for the operator to receive information concerning several control parameters without removing his eyes from a limited field of vision. For example, in certain chemical operations in which chemicals are mixed in an open vat, it is imperative that the operator keep his eyes on the batch as it is being mixed to note any color change. At the same time the operator would like to know certain other pieces of control information such as the temperature of the mixture, the length of time the batch has been mixed, etc. While such control information may be displayed in the usual manner by utilizing conventional meters, they necessitate the operator's removing his eyes from the batch itself in order to look at the meters. In removing his eyes from the batch, it is quite possible that certain changes might occur which would ruin the entire batch if not immediately corrected. The delay resulting from the required refocussing of the eyes may be of sufficient length to permit the batch to proceed to ruin.

Another example of the need for presenting control information to an operator without his removing his eyes from the normal field of vision occurs in the rolling of steel. In such an operation the operator cannot take his eyes off the steel itself. Yet, in many cases it is necessary for the operator to know such factors as temperature, speed, etc. of the steel. To remove his eyes from the steel for a sufficient length of time to read a meter may result in an accident. For this reason, the operator must generally make a good guess as to the unknown parameters, even though the informaion is available, but outside his normal field of vision.

Still another example of the need for a control instrument in which control information may be given to the operator without his removing his eyes from a limited field of vision is in the piloting of aircraft. In the present day aircraft it is necessary to provide the pilot with a considerable amount of information in order for him to operate and navigate his craft in an intelligent manner. This information is presented to the pilot in a multitude of ways. However, regardless of the particular configuration which the indicating mechanism assumes, one drawback is found common to all such instruments: The pilot must continually focus his eyes first at a short distance and then at infinity. This drawback stems from the fact that the pilot must look at the instrument panel in order to read his flight instruments. This necessitates his focusing his eyes for the relatively short distance to the instrument panel. In addition he must permit his eyes to become accommodated to the ambient illumination of the instruments.

After the pilot received his flight information from the various flight instruments mounted on the instrument panel, he is then able to look out through the windshield again. His eyes must refocus on the horizon and become adjusted to the new level of illumination.

This constant refocusing of the pilot's eyes greatly increases his fatigue, introducing a source of navigational error, as well as increasing his reaction time. The latter becomes extremely important during a landing maneuver where even a minor miscalculation or delay can lead to disastrous results.

In addition to presenting control information to an operator of an industrial process or the pilot of an aircraft without requiring him to remove his eyes from his normal field of vision, the present invention is so adapted that the control information may be moved within the operator's field of vision. This movement may impart further information to the operator. For example, the movement may result from an error in the operation. This permits the operator to make a correction without removing his eyes from the operation itself.

The invention further provides for the change of color and size of the image presented to the operator. Such changes may be controlled by certain operational parameters.

It is, therefore, a principal object of the present invention to provide a control instrument adapted to impart control information to the operator without requiring him to remove his eyes from his normal field of vision.

It is a further object of the present invention to provide a control instrument in which the control information is presented to the operator within his normal field of vision said control information arising from a plurality of signal devices.

It is still a further object of the present invention to provide a control instrument in which control information is combined from a plurality of sources and presented to the operator in an integrated manner within the operator's normal field of view.

It is a further object of the present invention to provide an aircraft flight instrument adapted to impart information to the pilot without requiring him to remove his eyes from his normal field of vision.

It is a further object of this invention to provide a flight instrument which presents flight data in a natural manner without requiring the pilot to make mental calculations.

It is still a further object of the present invention to provide a flight instrument adapted to present flight information arising from a plurality of sensing devices.

Briefly, the present invention utilizes a reflex projector which provides a fixed optical image and a movable optical image. The optics are so designed that both images are focussed at infinity in the operator's normal field of vision. The position of the movable image is adjusted by the control information. If the movable image ceases to be coincident with the fixed image, the operator is immediately aware, without removing his eyes from his normal field of vision, of an error in the control operation. The operator can then correct the control operation so as to reduce the error without removing his eyes from the control operation itself.

One example of the use of such a device is in a navigational instrument for aircraft. In such an instrument the movable image is controlled by the output of a plurality of sensing elements. If the movable image ceases to be coincident with the fixed image the pilot is immediately aware, without removing his eyes from the horizon, of an error in the heading of his craft. He can correct the orientation of his plane so as to reduce this error and bring his craft back on course without removing his eyes from the normal field of vision.

In one modification of this invention a sight line gyro is utilized. In this modification the gyro is precessed by the control signals from a plurality of sensing elements. The movable image is controlled by the gyro output signals. The invention further provides for comptation of the sensing element output, so that the movable image coincides with the fixed image while the pilot is flying either the correct course or is flying a desirable correcting course.

With the foregoing and still further objects and features in mind, the present invention includes the novel elements and the combinations and arrangements thereof described below and illustrated in the accompanying drawings, in which:

Figure 4 illustrates still another embodiment of the present invention used as an aircraft instrument.

Figure 5 is a modification of the devices shown in Figures 1, 2, 3 and 4, and

Figures 6, 7, 8, 8A, 8B, 9 and 10 illustrate details of the embodiments shown in Figures 1, 2, 3 and 4.

As above stated, the control system of the present invention may be used in a variety of applications such as, for example, industrial processes where a plurality of parameters must be accurately controlled by an operator and where, in turn, the operator must observe the effects of variations in the parameters on the processes. Or, the invention may be employed where a parameter or parameters must be held within close limits while at the same time the operator must be informed of changes in the parameters so that he may take corrective action without removing his eyes from the process.

Figure 1:
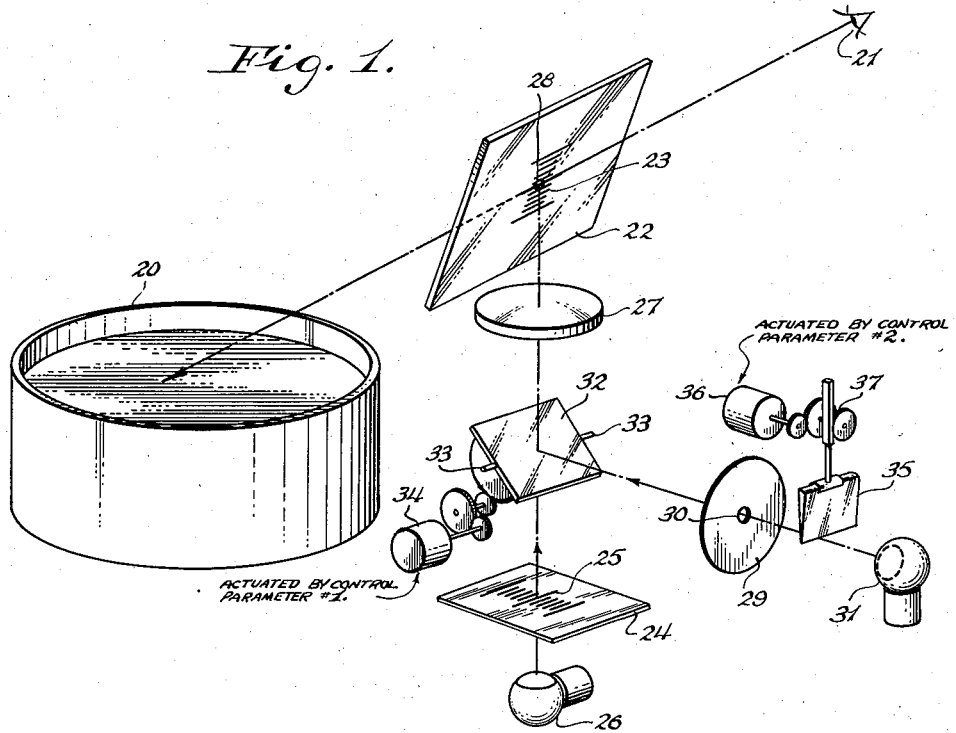
Figure 1 is a diagrammatic view of one embodiment of the present invention.

Purely by way of example, Figure 1 shows generally such a process in which a fluid composition in vat 20 must be watched closely by an operator 21 for changes in its condition. The operator may observe the progress of the process from a cab or enclosure through a window 22.

The operator may control the progress of the process by manipulating valves or levers (not shown) which in turn may control process parameters #1 and #2. He is informed of the changes in conditions by means of the mechanism of my invention.

Generally, my invention utilizes a reflex projector which projects a fixed optical image and a movable optical image on the glass window 22 of the operator's cab. The fixed optical image in the process shown in Figure 1 is a scale 23 which is formed by an opaque slide or transparent plate 24 having scale markings 25 pierced therethrough or inscribed thereon respectively. The scale is illuminated by a suitable source of light 26 and may be projected onto the window 22 by means of a collimating lens 27. The scale 23 serves as a reference for measuring variations in control parameter #1. The movable image of Figure 1 is a dot or small circle 28 which is formed by an opaque disc or transparent plate 29 having a small hole 30 cut therein or a small circle inscribed thereon respectively. The disc 29 is illuminated by a second source of light 31 and may be also projected on the window 23 by means of the same collimating lens 27. The dot or circle 30 is projected onto the axis of the lens 27 by means of a half-silvered mirror or vapor aluminized mirror 32. This semi-transparent mirror 32 permits the scale to be undistortedly projected therethrough but at the same time will permit the dot image to be reflected therefrom onto the window 22.

The mirror 32 is provided with pivots 33 which are journaled in a suitable fixed frame or in the instrument casing. The dot image is caused to move along the scale 23 by rotating the mirror 32 by means of a suitable motor 34 through reduction gearing if required. Thus, if the motor 34 is energized by a signal responsive to changes in parameter #1, the movable image 28 will move up or down the scale 23 in response to this signal, thus indicating to the operator 21 a change in the first parameter.

Changes in the parameter #2 may be indicated to the operator by changing the intensity or color of the movable image 28. As shown, this may be accomplished by inserting a light attenuating wedge 35 into the light beam which produces image 28. The wedge 35 may be positioned by a suitable motor 36 through a gear train, if required, and a rack and pinion 37. If it is desired to indicate variations in parameter #2 by changing color intensities the wedge may be of colored material such as glass or plastic. Thus, if the wedge is just touching the beam, the color of the image 28 will be very pale. If the wedge is positioned further and further into the beam, the color will become deeper and deeper. If the motor is controlled by a signal which is responsive to changes in parameter #2, it will, through positioning wedge 35 progressively in or out of the beam, indicate these changes in parameter #2.

Of course, changes in a third parameter may be introduced by a similar wedge placed in the beam cast by the scales 25 thus changing the color or intensity of the scale.

It is of great importance that the lens 27 and any other associated lenses be so shaped and adjusted that the images cast upon the window 22 be focussed at infinity. This means that the operator will not see the images on the glass window, but will see the images as though they were at or beyond the surface of the liquid in the vat 20. Thus, the operator will clearly see the images and be informed of changes in parameters #1 and #2 while his eyes remain focussed at the liquid surface, within his normal field of vision.

It is to be understood that my invention may be used to great advantage in a variety of applications. Another application, as above mentioned, is in the manual control of aircraft where the pilot need not remove his eyes from the direction of the windshield of the aircraft and yet will still be informed of changes in his flight attitude. In addition, as will be described, he will be able to note changes in other variable factors of which he must be aware for the proper and safe operation of his craft and protection of his passengers. The invention in its application to aircraft control and instrumentation is especially useful in highly maneuverable aircraft such as military fighter craft where maneuvering information may be obtained from a tracking and/or search radar.

Figure 2:
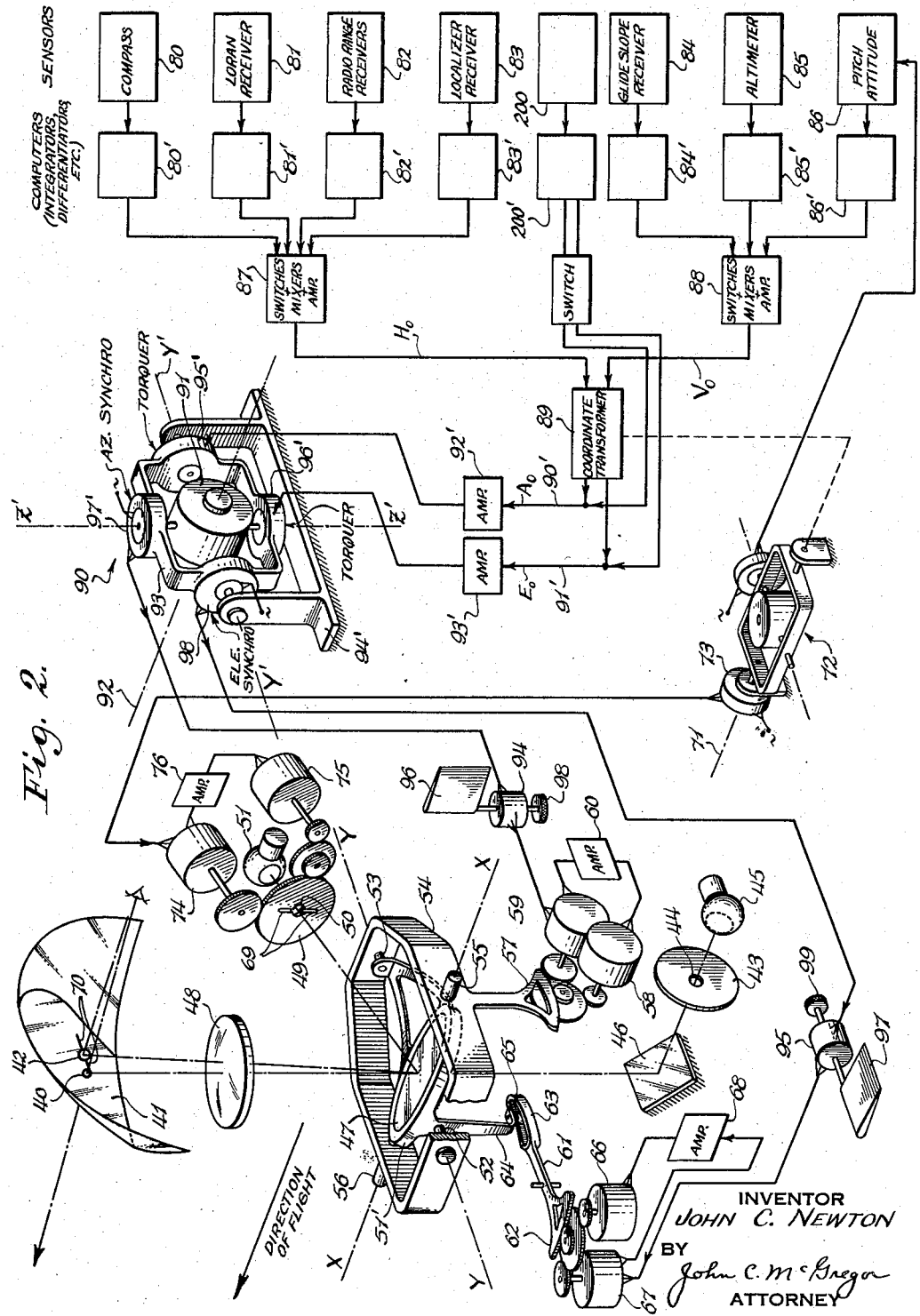
Figure 2 is a diagrammatic view of the present invention used as a navigational instrument.

Figures 2 through 12 illustrate various embodiments of my invention in its applications to aircraft control and instrumentation. Figure 2 shows schematically an embodiment of my invention wherein a fixed or reference image 40 is projected onto the windshield 41 of an aircraft together with a movable image 42 which is displaceable relative to the reference image by information of the craft's attitude and/or position relative to a preselected flight path.

The fixed image 40 is projected onto the windshield 41 by means similar to that shown in Figure 1. A disc 43 having a small aperture 44 therein is placed in front of a source of light 45 and the beam or ray produced thereby is projected onto the windshield 41 by means of an angled mirror 46 through a semi-transparent mirror 47 and collimating lens 48. Here again, as in Figure 1, the optics of the system must focus the images not on the windshield but at infinity so that the pilot's eyes, while focussed on a distant object, will not have to focus on the windshield in order to see the images clearly.

The movable image 42 is produced in a similar manner. A disc 49 having an aperture 50 therein is placed in front of a light source 51 and the beam or ray produced thereby is projected onto the windshield 41 by means of the semi-transparent mirror 47 and collimating lens 48. The mirror 47, of course, allows the fixed image 40 to pass therethrough and at the same time will reflect the movable image. By proper alignment of the mirrors, as illustrated, the fixed and movable images will, under normal conditions, coincide.

The means for moving or displacing the movable image 42 relative to the reference image 40 will now be described. It can be seen that if the semi-transparent mirror 47 is mounted so that it can be tilted, the image reflected thereby will move. Therefore, the mirror 47 is mounted in a frame 51 having pivots 52 and 53 which serve to allow rotation of the mirror 47 about axis Y—Y. The pivots 52 and 53 are journaled in a normally horizontal frame or gimbal ring 54 which, in turn, is provided with pivots 55 and 56 at right angles to pivots 52 and 53 whereby the mirror is allowed to angularly rotate about the axis X—X. The axes Y—Y and X—X are preferably generally aligned with or parallel to the pitch and roll axes, respectively, of the aircraft. Thus, by rotation of the mirror 47 in its gimbals, the movable image 42 may be positioned in any direction relative to the fixed image 40. Mirror 47 is rotated about the X—X axis by means of a sector gear 57 attached to gimbal 54 and also geared to a driving servomotor 58. The servomotor 58 is energized by signals derived from a plurality of sensors sensitive to azimuthal craft movements from a selected flight plan by means of a suitable synchro data system including receiver synchro 59 and servomotor amplifier 60. Rotation of the mirror 47 about the Y—Y axis is accomplished by means of a pivoted arm 61, one end of which is provided with a sector gear 62 and the other end of which is provided with a slot 63. An arm 64 on the mirror frame 51 has a ball 65 thereon which engages the slot 63 whereby motion is imparted to the mirror frame about axis Y—Y while at the same time permitting motion of the mirror about axis X—X. Such a mechanical arrangement can be used since the angles through which the mirror is rotated are relatively small. A servomotor 66 drives the sector 62 through suitable gearing. Servomotor 66 is energized by signals derived from a plurality of sensors responsive to elevational craft movements from a selected flight plan by means of a synchro data system including receiver synchro 67 and servo amplifier 68. Thus it can be seen that movements of the movable image in all directions can be accurately controlled by positioning the mirror 47 about axes X—X and Y—Y by the servomotors 58 and 67, respectively.

The gimballed mirror 47 provides the pilot with indications of craft deviations in azimuth and elevation from a selected course. A third deviation roll may also be provided. The hole 50 in the disc 49 which forms the movable image 42 may be shaped as shown at 69 in the form of a winged dot. This, of course, adds wings 70 to the movable image 42. Therefore, by rotating the disc 49, the winged image 42 will be caused to angularly rotate also. The disc 49 may be positioned angularly according to the actual bank angle of the craft by means of a synchro-data system between the roll axis 71 of a vertical gyro or other vertical reference device 72 and the disc 49, including transmitter synchro 73, receiver synchro 74, and servomotor 75, energized by the output of receiver synchro 74 through a servomotor amplifier 76.

The lateral, vertical and rotational motions of the movable image 42 are utilized in the particular embodiment of my invention shown in Figure 2 to cause the image to simulate a distant object stabilized in space. In this embodiment the fixed image, 40, may, by design, be so located in the field of vision that it represents a projection of the craft's fore and aft axis. The pilot then may so control his craft that the fixed image 40 is maintained coincident with movable image 42. The craft will then be headed directly toward the point in space simulated by the movable image and will thus fly a straight course, and straight flight will be possible under conditions of poor visibility without need for the pilot to refer to instruments or sources of information other than the two projected images. A further feature of this embodiment is that the distant object simulated by image 42 may be caused to change its apparent position in space. This may be done in such a way that the pilot, by keeping the fixed image 40 aligned with movable image 42 will thus guide his craft to a preselected objective such as an airport runway. These characteristics are achieved in the embodiment of Figure 2 by making use of the well known characteristics of the gyroscope, in conjunction with the signal data outputs of a plurality of position and attitude sensing devices. In another embodiment described later I show that substantially the same characteristics may be achieved without use of a gyroscope.

As is well known a gyroscope tends to maintain its spin axis at a fixed angular orientation in space. This embodiment of my invention makes use of a gyroscope 90 and provides means for coupling the movable image 42 to the spin axis thereof so that the line of sight established by image 42 is always parallel to the spin axis. A gyroscope rotor whose spin axis is shown at 92, is contained in rotor case 91 which in turn is supported in low friction bearings in gimbal 93 the axis of these bearings being approximately parallel to the craft's yaw axis. Gimbal 93 is in turn carried in a frame 94' by low friction bearings whose axis is parallel to the craft's pitch axis. Synchro 97' of gyroscope 90 by its connection to synchro 59 provides coupling of the movable image to the gyro spin axis in an azimuthal sense. Synchro 98 by its connection to synchro 67 provides similar coupling in an elevational sense. It will be evident from the foregoing description that since the gyro spin axis remains stationary in space, any motion of the craft in pitch or in yaw will cause a change in the output of synchro 97' or synchro 98, which will be transmitted to the optical system. It will be evident that proper selection of design constants will permit giving to the sight line established by image 42, a motion with respect to craft coordinates equal to the apparent motion of the spin axis in craft coordinates. The image 42 will therefore appear to be fixed in space, and as such provides a desirable reference for flight under conditions of poor visibility.

As an aid to the pilot in guiding the craft to a preselected destination, the gyro is coerced by means now to be described, so that its spin axis does not remain fixed in space, but rather moves so that it will align itself with a course to the desired destination. Given information on a craft's present position and direction of motion automatic computational means may be provided for determining the nature of the change in course, if any, required to arrive at a preselected destination. Such means are well known in the art and are not claimed in this invention. Means for sensing present position and direction of motion are also well known and are not claimed in this invention. In this embodiment of my invention I use a plurality of such sensors, 80, 81, 82, 83, and a plurality of such computers 80', 81', 82', 83', to determine the nature of the course change required in a horizontal plane. This information is the output of mixer 87. I also use a plurality of such sensors, 84, 85, 86 and a plurality of such computers 84', 85', 86' to determine the nature of the course change required in a vertical plane. This information is the output of mixer 88.

Data from an additional sensor element is also fed through computer 200' to give additional information in both the horizontal and vertical plane. This additional sensor element may consist of a tracking radar unit located on the ground. In aircraft carrier use it may consist of a radio guidance unit controlled by the deck flight officer. Additional sensor elements may, of course, be added.

Since the gyroscope 90 is gimballed about axes carried in a craft which may not be aligned with the vertical and horizontal planes, due to the necessity for banking during turns, I use coordinate transformer 89 in order to make proper use of the data supplied as the outputs of mixers 87 and 88. Such coordinate transformers are well known in the art and are not claimed as part of this invention. Coordinate transformer 89 in addition to receiving the outputs of mixers 87 and 88 also receives information on the craft bank angle from vertical gyro 72. It produces outputs $A_0$, appearing on lead 90', and $E_0$ appearing on lead 91'. These quantities are defined by the following relationships established by the coordinate transformer:

$$A_0 = H_0 \cos B + V_0 \sin B$$
$$E_0 = V_0 \cos B - H_0 \sin B$$

where:

$A_0$=coercing signal to gyroscope (about craft yaw axis)
$E_0$=coercing signal to gyroscope (about craft pitch axis)
$H_0$=horizontal data supplied by mixer 87
$V_0$=vertical data supplied by mixer 88
$B$=craft bank angle Signal $A_0$ is amplified by amplifier 92' and applied to torquer 95' thereby producing a precession of the gyroscope about its yaw or inner gimbal axis designated as $Z'—Z'$. Signal $E_0$ is amplified by amplifier 93' and applied to torquer 96' causing precession of the gyroscope about its pitch or outer gimbal axis designated as $Y'—Y'$.

From the foregoing it will be evident that by proper design the gyroscope spin axis may be given the azimuthal and elevational motions called for by the outputs of mixers 87 and 88, these motions being defined in space coordinates regardless of the bank orientation of the craft. The characteristics of the feedback loop may be altered by introducing the output of azimuth synchro 97' into compass computer 80' and the output of elevation synchro 98 into pitch attitude computer 86'.

Figure 3:
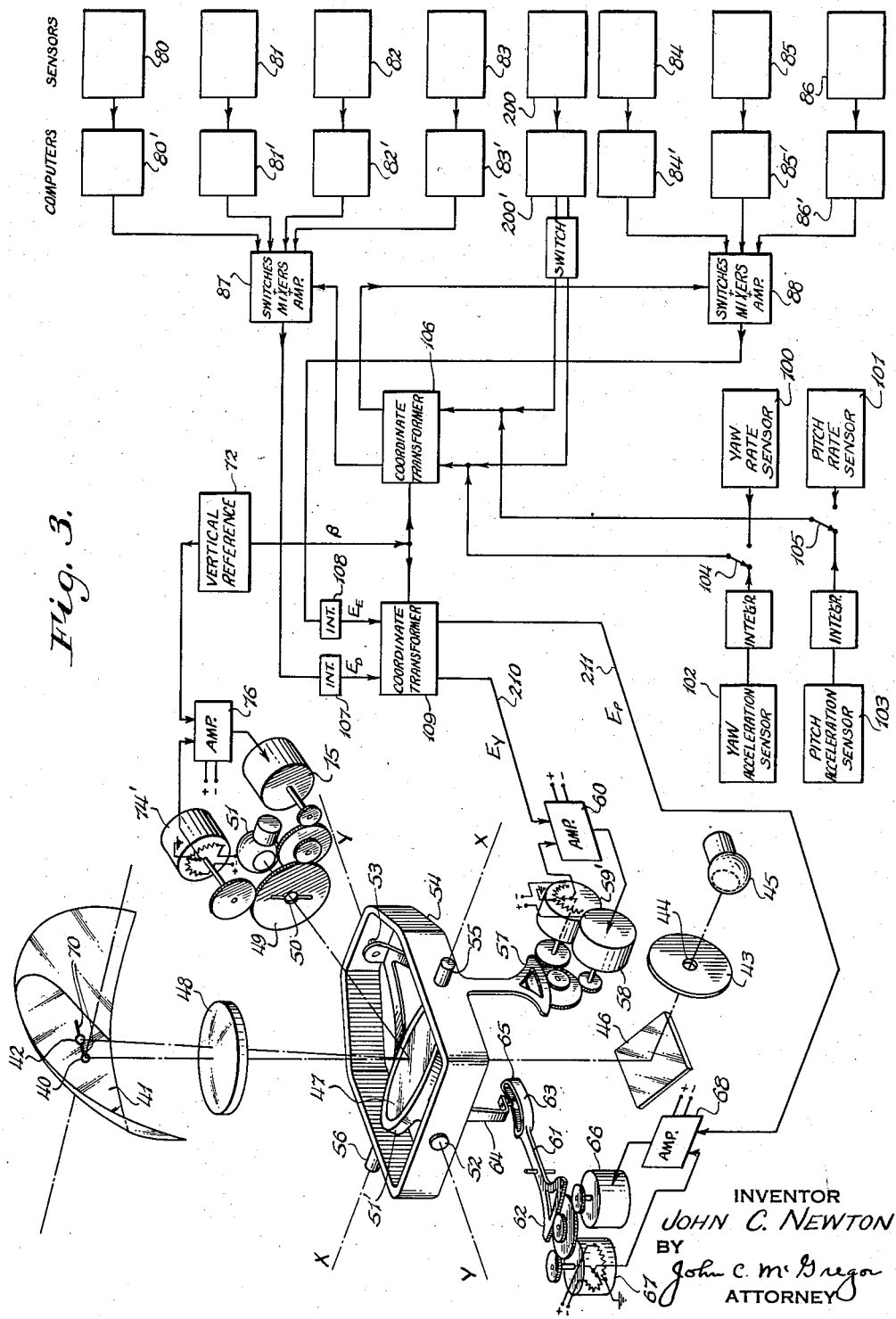
Figure 3 is a diagrammatic view of another embodiment of the present invention used as a navigational instrument.

The optical indicating control system schematically illustrated in Figure 3 is substantially identical to that shown in Figure 2 except in the means for stabilizing the movable image. Since the optical system is identical in both figures like reference characters designate like parts therein.

Instead of using the director or line of sight gyroscope to establish the craft coordinates of a simulated space reference, these coordinates are computed by means now to be described. The position of the simulated reference in craft coordinates is given by a yaw angle measured about the craft's yaw axis and a pitch angle measured about the craft's pitch axis. These two angles are represented by voltages $E_y$ and $E_p$ respectively, appearing on leads 210 and 211 respectively. By suitable design the angular deflections of the movable image about the yaw and pitch axes are made directly proportional to these voltages. A second set of coordinates in which the simulated reference may be defined is one in which one angle is measured about a first or directional axis through the center of the craft normal to its longitudinal axis, and contained in a vertical plane, while the second angle is measured about an elevational axis, perpendicular both to the first axis and to the craft longitudinal axis. These two sets of coordinates differ only by the roll attitude of the aircraft. For convenience in this discussion the coordinates based on the yaw and pitch axes of the craft will be referred to as craft coordinates while the second set described above will be designated space coordinates, recognizing of course that they are only partly space stabilized.

In the space coordinate system, the displacement angle of the simulated reference measured about the directional axis has as its analog the voltage $E_D$ appearing as the output of integrator 107. The elevational angle of the simulated reference has as its analog the voltage $E_E$ which is the output of integrator 108. When the craft bank angle is zero, $E_Y = E_D$ and $E_p = E_E$ since the two coordinate systems coincide. When the bank angle is other than zero, the relationships are as follows:

$$E_Y = E_D \cos B + E_E \sin B$$
$$E_p = E_E \cos B - E_D \sin B$$

These relationships are established by coordinate transformer 109. It is evident that if the craft now maintains a straight flight path and merely rolls about its longitudinal axis the position of the image representing the simulated reference will move with respect the craft axes in the same manner as would an object which is stationary in space.

Stabilization of the simulated reference against motions of the craft about its yaw and pitch axes is accomplished by first detecting the craft's angular velocities about its yaw and pitch axes. The signals which are the analogs of these angular velocities are then transformed by means of coordinate transformer 106 to signals which are the analogs of corresponding craft angular velocities about the space coordinate axes. Each of these signals is then integrated to give a signal analogous to the angular displacement of the craft about the particular axis in question. The craft angular velocities and displacements are introduced in the negative sense according to whatever convention is adopted for relating signal polarities and angular directions, therefore the integrator output signals represent the coordinates of a reference which remains fixed in space.

The optical indicating control system shown schematically in Figure 4 is similar to that shown in Figures 2 and 3 except that the signal supplied to the mirror positioning servomotors 58 and 66 are combined in a different manner. As before, the pilot should concentrate on keeping the movable image 42 coincident with the fixed image 40 at all times.

The sensors used in the system of Figure 4 comprise various radio track receivers 82 such as very high frequency or visual omni ranges, a localizer receiver 83, a compass 80, a vertical gyro 72, or equivalent, for use in obtaining both roll and pitch data, a glide slope receiver 84, and an altitude sensing element 85.

The outputs of these sensors may be combined in a manner determined by the function selectors and amplifiers 110 and 111 which respectively combine horizontal information and vertical information. The outputs of 110 and 111 are then mixed with roll and pitch signals from the vertical gyro 72 in suitable mixer amplifiers 112 and 113. The resulting signal may, if desired, be limited so as to limit the amount of deflection of the movable image 42 and hence the amount of command control on the aircraft. In Figure 4 the mirror positioning servomotors 58 and 66 are controlled by the signals generated within the mixer amplifiers 112 and 113. The reference supply is shown at 114 and supplies a reference voltage for the mixers and also for the follow-up potentiometers 59' and 67'. Control output signals appearing at leads 115, 116 drive the mirror positioning servomotors 58 and 66 until the follow-up signals from potentiometers 59' and 67' just balance the signal from the mixers, at which time the mirror 47 will be positioned in accordance with the information supplied by the various sensors.

General operation of the system of Figure 4 may best be described by considering a particular mode of operation as selected by the function selectors 110, 111. Suppose it is desired to navigate a craft manually down an instrument landing radio beam. In such a case the function selector will insert into the mixer amplifier 112 signals proportional to the magnitude of the lateral craft displacement from the localizer beam and a signal proportional to the magnitude of angular deviation of the heading of the craft from localizer heading. In addition a signal from the roll axis of the vertical gyro will be supplied to the mixer 112. The mixer amplifier 113 will receive from the function selector 111 a signal proportional to vertical craft displacement from the radio glide slope beam. Also, a signal proportional to craft pitch angle will be supplied to the mixer 113.

For the sake of illustration, assume the craft is in level flight and is off to the right of the localizer beam, with a heading parallel to the heading of the beam. Under this condition the only signal being supplied to the lateral mirror positioning servomotor 58 is the full localizer signal, since compass signal and bank signal are both zero. The movable image 42 will then be displaced to the right by an amount proportional to the craft displacement from the beam. A change of craft attitude is called for. The pilot therefore banks his craft to the left. The roll gyro will produce a signal of such polarity as to move the mirror 47 and hence image 42 to the left. When the image 42 coincides with the reference image 40, the pilot will stop thte bank by centralizing his controller. As the craft turns toward the beam in response to the banking thereof, a heading signal will be produced by the compass. However, as the craft approaches the beam, the beam signal will decrease. Hence, when the heading signal is equal and opposite to the beam signal, roll angle of the craft must be removed in order to keep the movable image 42 coincident with the reference image 40. The opposite sequence occurs as the craft approaches very close to the beam; i.e. as the radio displacement signal decreases, the existing heading signal will tend to cause the movable image 42 to move to the left of the reference image 40 calling for banking of the craft to the right. Here again banking of the craft will immediately cause the image 42 to move toward the reference image 40. As the craft turns to the right in response to its banked attitude, the radio signal will decrease at a slower rate until eventually, by maintaining the two images coincident, the craft will settle out smoothly on the radio beam.

Suppose now the craft is below the glide slope beam and flying straight and level. The only signal being transmitted to the mirror positioning motor 66 is the glide slope displacement signal; hence, the movable image 42 will lie below the reference image 40 calling for a change in craft attitude, i.e. fly up. The pilot then pitches his craft upward until the image 42 coincides with image 40. As the craft pitches, a pitch signal is generated by the vertical gyro 72. When the pitch signal is just equal and opposite to the beam displacement, the signal to the mirror positioning motor 66 is zero, and the image 42 will coincide with image 40. Therefore, if the images are maintained coincident, a smooth approach will be made to the glide slope beam.

Of course, the signals may be limited as required, in order to hold the flight path of the craft within predetermined limits. For example, the radio signal may be limited to limit the angle of approach to the beam and also the heading signal may be limited to limit bank angle and hence rate of turn.

It is immediately apparent that the main advantage of the application of my invention in the embodiment thereof shown in Figure 4 resides in the fact that the pilot is always advised of his progress toward a landing strip on the radio beam without having to remove his eyes from the view through the windshield. This is extremely important because he is, in making an instrument approach through clouds, constantly watching for breakthrough.

In Figure 5 there is shown means for varying the position of the reference image 40. Since it is desired to have the craft fly on a predetermined flight path when the movable image 42 coincides with the fixed image 40, any parameter which changes the attitude of the craft relative to the flight path must be compensated for by changing the position of the reference image. In other words, if the fore and aft axis of the craft does not lie normally parallel to the flight path, the reference image must be moved relative to the fore and aft axis by an amount proportional to the angle between the flight path and the fore and aft craft axis. Examples of such parameter changes are changes in angle of attack and angle of side slip. As shown in Figure 5 these parameters may be made to control the position of the fixed or reference image. The mirror 46' is made tiltable about fore and aft and athwartship axes X' and Y' respectively, by supporting it for pivotal movement about the Y' axis in a gimbal frame or yoke 120 which is in turn pivotally supported for rotation about the X' axis. The mirror 46' is positioned about the X' axis by means of a synchro data system similar to that used in Figure 2 and including receiver synchro 121, motor 122 and servo amplifier 123. Likewise the mirror 46' is positioned about the Y' axis by means of a synchro-data system including receiver synchro 124, motor 125 and servo amplifier 126. Motion of motor 125 is transmitted to the mirror 46' by means of a bail member 127 pivoted for rotation about the Y' axis and slotted arm 128 fixed to the mirror.

The receiver synchro 121 may receive mirror positioning signals from transmitter synchro 129 which is positioned by a side slip detector or vane 130. In addition the position of the reference image 40 may be laterally adjusted by the pilot through means of a manual setting knob 131 attached to the case of the transmitter synchro 129. In the same manner, receiver synchro 124 may receive mirror positioning signals from a transmitter synchro 134 which is positioned in accordance with angle of attack as measured by a suitable vane 135. Manual vertical adjustments, such as for craft pitch conditions may be provided by means of differential synchro 133 controlled by knob 137.

In accordance with another feature of my invention, I show a means of warning the pilot of an impending stall attitude. This is accomplished by use of a glass wedge 141 which may, for example, be colored red. If the craft is in a safe attitude the wedge 141 is withdrawn so that it will not attenuate the image forming beam, but if a craft approaches a stall condition, the wedge is translated into the beam by a motor 142 energized by an error signal generated by a synchro data system including synchro 143 and amplifier 144. This system progressively changes the color of the fixed image 40 from a light pink to a deep red. A signal responsive to an approaching stall attitude of the craft is generated in a stall computer 145 from signals responsive to angle of attack and wing flap position as shown.

The modification illustrated in Figure 6 includes a means for indicating variations or changes in a parameter which must be held within predetermined limits. An application of this modification may be found, for example, in military aircraft such as radar equipped interceptors which can release rockets against enemy aircraft. In this application the firing of the missile by the pilot may have to take place within a maximum and minimum target range. Another example may be formation flying where one craft must follow another within predetermined range limits.

In this modification of my invention, I form in the view through the craft's windshield 41 a pair of concentric parameter limit circles 150 and 151 which are formed by circular cut outs or slits 152 and 153 in an opaque plate 154. The light beams formed thereby from light source 155 are projected through collimating lens 48 and thence to the windshield. Of course, in this modification as in all others, the lens system is so arranged as to focus at infinity. The movable, or variable parameter, image 156, is in the form of a plurality of diamond-shaped light images which are formed by a pair of discs 157 and 158, each having a plurality of partial spiral slots 159 and 160 respectively cut therein. These plates or discs are placed together in such a manner that small diamond-shaped holes are formed. The slots 159 and 160 each curve in opposite directions so that if the two discs are rotated in opposite directions as by suitable gearing 161, the holes will move radially in and out in proportion to the extent of the relative opposite angular rotation. The two discs 157 and 158 are shown separated in Figure 7 for greater clarity. If a light source 162 is placed in back of the disc members 157 and 158, a plurality of diamond-shaped light beams will be projected onto the windshield by means of the mirror 163. In the embodiment illustrated, the discs 157 and 158 are positioned in accordance with a control parameter 164 by means of a synchro data system including receiver synchro 165, motor 166, and amplifier 167. Thus, by observing the diameter of the diamond-shaped images 156 relative to the parameter limit images 150 and 151, the pilot is informed as to variation of the parameter toward or away from its predetermined limits and may take the required control action. As in the embodiments shown in Figures 2 and 3 and 4, the position of images 150, 151 and 156 may also be shifted to give additional data to the pilot.

As stated in the description of Figures 1 and 5, variations of a parameter may be indicated by changing the light intensity or colors of one or more of the projected means. In Figures 1 and 5 this is accomplished by moving a wedge of colored glass progressively into and out of the projected beam. In Figures 8, 8a and 8b there is shown another means whereby not only the color intensity may be varied, but also the color itself. In many instances where colored lights of the same or even of different colors are used to indicate a malfunction, the lights usually indicate satisfactory operation or unsatisfactory operation. In such cases an approach toward a malfunctional or a slowly failing operation is not indicated. Such indicators are strictly an "on-off" proposition. In Figures 8, 8a and 8b an indication of slowly failing parameter or control condition is obtained by means of a wedge-shaped disc 170 of glass or another transparent material which is placed with the outer part of its face in the light beam indicated by the dotted circle 171. The wedge 170 may be made of two pieces of differently colored glass, 172, 173. These pieces may be colored red and green and may be joined together. In this way, the motor 174, which is connected to a control parameter, rotates the disc 170. If the thick green portion thereof intercepts the light beam, the color of the image will be dark green indicating proper operation of the parameter control. However, if the parameter control begins to indicate a failing condition, the motor will rotate the disc so that the green color becomes less intense. This rotation may continue until the disc 170 is in the position shown, at which point the image will have an almost white, green-red hue. If the condition of the parameter grows worse, the disc 170 will be rotated further until the image glows light red and than dark red, indicating complete failure of the parameter.

In the form of my invention shown in any one of Figures 1–5, it may be desirable to provide an indication of the heading of the aircraft. This may be accomplished by the means shown in Figure 9 wherein a transparent cylinder 180 engraved with an opaque compass scale is placed adjacent an enlarged fixed image aperture 181 in disc 182. A light source 183 may be placed at the center of rotation of the cylinder 180 as shown. The projected fixed image will in this manner include an indication of heading as the compass card cylinder 180 is positioned by means of a compass repeater motor 184. Such an indication could also be roll stabilized by either controlling the reflecting mirror or the compass card cylinder 180 by means of a vertical reference.

In Figure 10 there is shown an aircraft windshield 41 on which are projected through the lens system, including collimating lens 48, the fixed image 40, movable image 42, the parameter limit circles 150–151, the variable diameter circle formed by images 156 and a plurality of variable color images 185 which may be formed by the means of Figure 8, and may indicate the condition of plurality of parameters such as engine conditions, oxygen supply, flap conditions, etc.

Thus, by the use of my invention a pilot may be informed as to the entire performance of his aircraft without having to move his eyes from the flight path of his aircraft. Nor will he have to continually focus and refocus his eyes on the windshield of his craft because the various images will be focused at infinity. By the use of my invention, eye strain and its resulting pilot fatigue will be greatly reduced and a far greater degree of maneuvering accuracy and hence craft safety will result.

In a like manner the operator of any controlled operation may receive information concerning control parameters without removing his eyes from his normal field of vision. The operator will be able to follow the results of his corrective movements without removing his eyes from the work itself.

I claim:

1. In a dirigible craft having a longitudinal axis of motion, optical indicating means carried by the craft for facilitating manual control thereof, comprising, a viewing window inclined with respect to the line of sight of the operator along the fixed longitudinal axis of the craft to reflect incident light, first and second detecting means responsive to characteristic functions of the moving craft to afford signals representative thereof, first image-producing means to project a first light onto the window to be reflected therefrom focused at infinity along the line of sight of the operator, second image-producing means to project a second light image onto the window to be reflected therefrom focused at infinity along the line of sight of the operator, first image-modifying means including a reflector interposed in the light projection path of an image between the source and the window and responsive to said detected signals of said first detecting means, said reflector having support members to tilt the reflector through a plurality of planes to cause one of the images to move in translation relative to the other on the window, second image-modifying means interposed in the light path of a projected image between the source and the window and responsive to detected signals of said second detecting means, said second image-modifying means including a beam-shaping mask rotatable about the axis of light projection therethrough to cause one of the images to rotate relative to the other on the window, whereby two sets of information are conveyed to the operator by means of a pair of images movable in relative rotation and translation, whereby the operator can manually operate the craft selectively by direct sight ahead of the craft through the window or without refocusing his eyes by the intelligence conveyed to him independently of the exterior view by the two complementary images reflected from the window.

2. In a dirigible craft having a longitudinal axis of motion, optical indicating means carried by the craft for facilitating manual control thereof, comprising, a viewing window inclined with respect to the line of sight of the operator along the fixed longitudinal axis of the craft to reflect light incident thereon at angles thereto, detecting means responsive to a characteristic function of the moving craft to afford signals representative thereof, first image-producing means to project onto the window a first image focused at infinity and reflected along the line of sight of the operator, second image-producing means to project a second image onto the window to be reflected therefrom focused at infinity along the line of sight of the operator, and image-modifying means responsive to said detected signals of said detecting means and interposed in the projection path of at least one of said image-producing means between the image source and the inclined window to control the two images, one relative to the other, to convey intelligence to the operator, said image-modifying means comprising, movable reflecting means to change the position of one image relative to the other, and color filter means selectively interposable in the light path of one of the images to change the appearance of the two images, one relative to the other, whereby two sets of information can be conveyed to the operator by means of a pair of images whereby the operator can manually operate the craft selectively by direct sight ahead of the craft, or, without refocusing his eyes, by the intelligence conveyed to him independently of the exterior view by the two complementary images reflected from the window.

References Cited in the file of this patent

UNITED STATES PATENTS

| | | |
|---|---|---|
| 1,760,163 | Morris | May 27, 1930 |
| 2,316,466 | Storer | Apr. 13, 1943 |
| 2,391,357 | Sperry et al. | Dec. 18, 1945 |
| 2,406,828 | Grimshaw | Sept. 3, 1946 |
| 2,464,195 | Burley et al. | Mar. 8, 1949 |
| 2,537,996 | Hankes | Jan. 16, 1951 |
| 2,577,785 | Lyon | Dec. 11, 1951 |
| 2,613,252 | Kellogg | Oct. 7, 1952 |
| 2,613,350 | Kellogg | Oct. 7, 1952 |
| 2,684,007 | Newell | July 20, 1954 |
| 2,685,226 | Crane | Aug. 3, 1954 |
| 2,694,869 | McNatt | Nov. 23, 1954 |

FOREIGN PATENTS

| | | |
|---|---|---|
| 776,640 | France | Nov. 8, 1934 |
| 666,562 | Germany | Oct. 24, 1938 |